C. DE-FELICE.
MAGAZINE FEED AND GUN FOR USING SAME.
APPLICATION FILED MAR. 15, 1918.
1,354,432.
Patented Sept. 28, 1920.
3 SHEETS—SHEET 1.
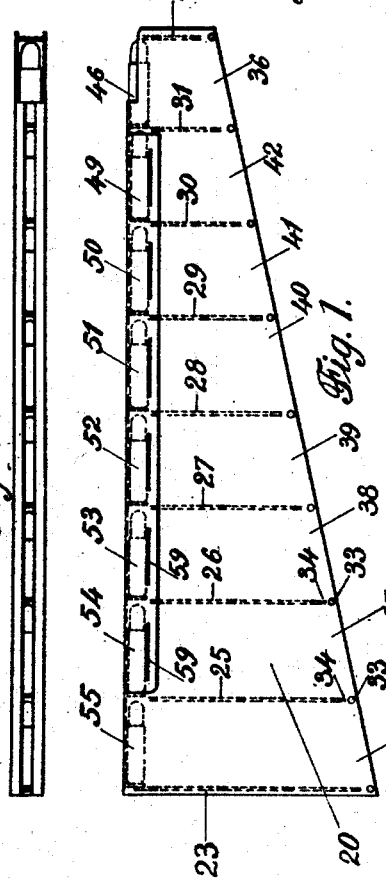
INVENTOR
Carlo De-Felice
BY
ATTORNEY

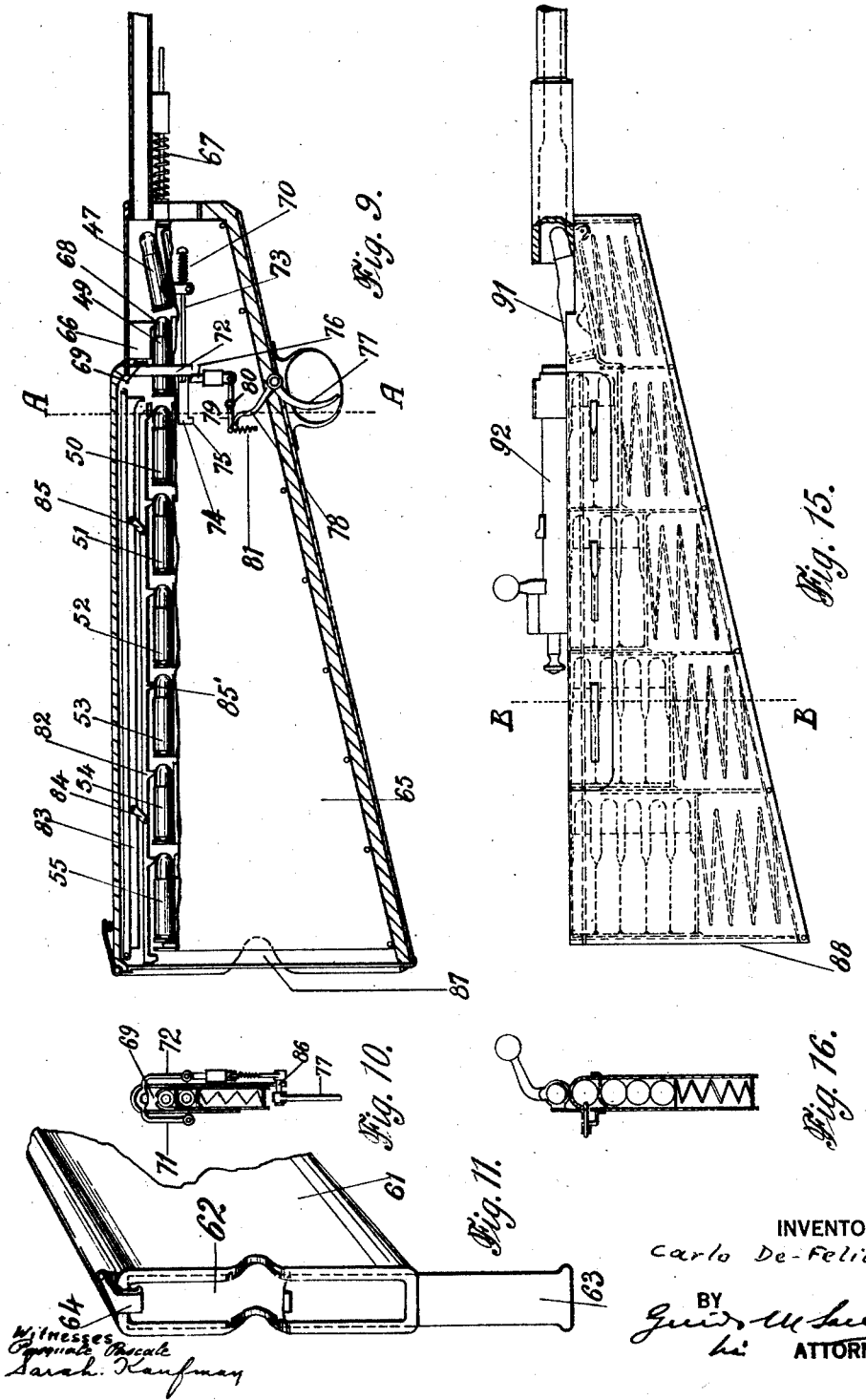

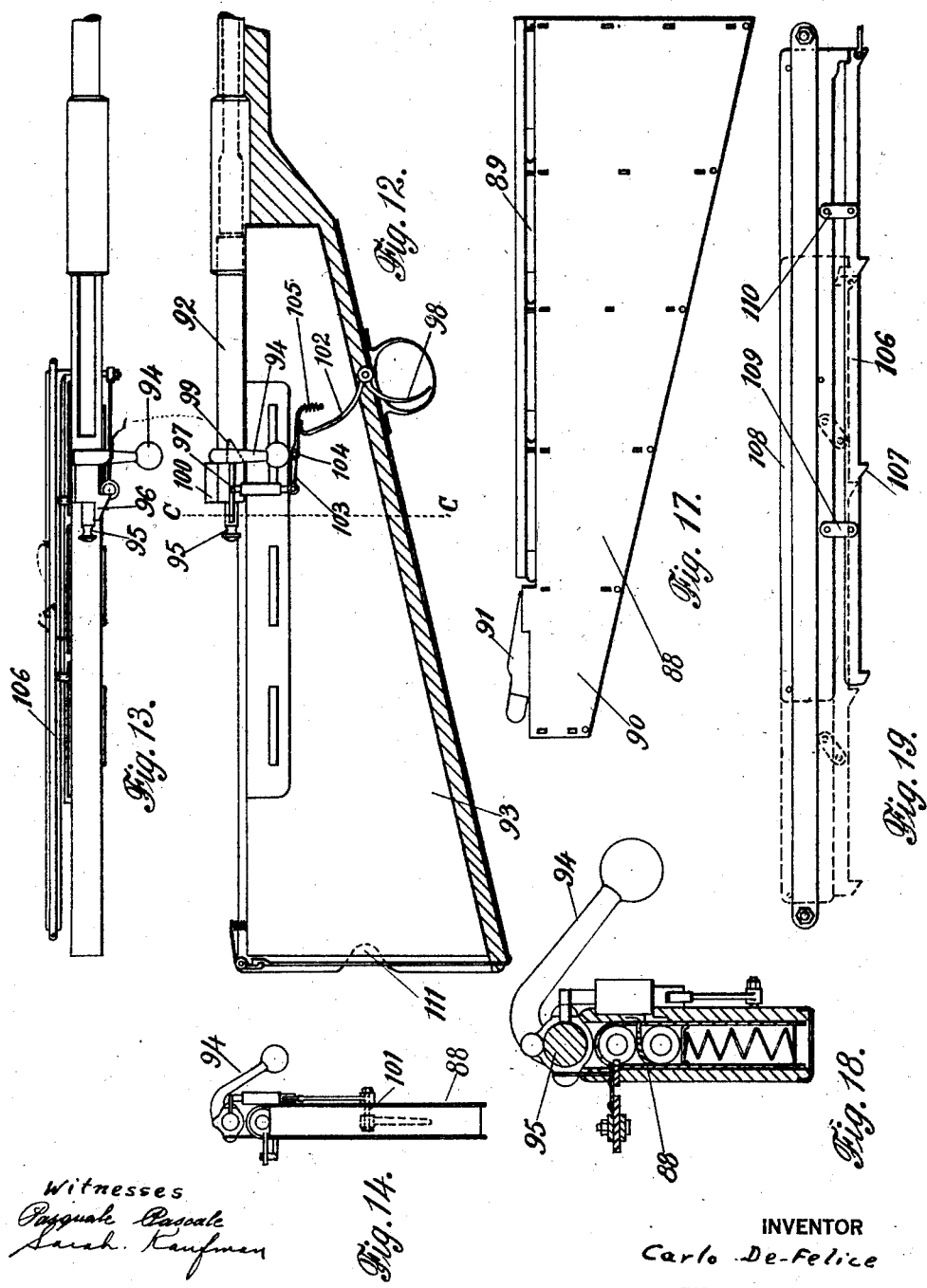

UNITED STATES PATENT OFFICE.

CARLO DE-FELICE, OF NEW YORK, N. Y.

MAGAZINE-FEED AND GUN FOR USING SAME.

1,354,432.    Specification of Letters Patent.    Patented Sept. 28, 1920.

Application filed March 15, 1918. Serial No. 222,607.

*To all whom it may concern:*

Be it known that I, CARLO DE-FELICE, a citizen of the United States, residing in the borough of Manhattan, city, county and State of New York, have invented certain new and useful Improvements in Magazine-Feeds and Guns for Using Same, of which the following is a full, clear and exact description, reference being had to the accompanying drawings forming a part of this specification.

My invention relates to magazine feeds for guns and to mechanism for operating the same; and its primary object is to provide a novel and improved feeding arrangement particularly adapted for all kinds of rifles and automatic guns, including a magazine box of a very simple and compact construction; said magazine box being adapted to hold a considerable number of cartridges while at the same time utilizing to the maximum what is now practically dead space in the ordinary form of gun.

Another object of my invention is to provide a simple and improved magazine feed which can readily be embodied in the construction of automatic guns as well as hand operated guns or rifles.

A still further object is to provide a novel and improved form of magazine box which can be readily inserted in or removed from a suitable housing provided in the gun itself, which can, in fact, be inserted in and removed from the gun as easily and readily as the ordinary cartridge holder used in the Springfield rifle, but which can contain a greater number of cartridges without requiring any noticeable increase in the size or weight of the gun itself.

This invention relates furthermore to certain novel constructions and arrangements of parts as will be hereinafter described and claimed in the appended claims.

Referring to the drawings—

Figure 1 is a side view of a magazine box constructed according to my invention;

Fig. 2 is a plan view of the same;

Fig. 3 is a rear elevation of the same;

Fig. 4 is a front view of the same;

Fig. 5 is a detail vertical longitudinal sectional view of the forward part of the magazine box in an inverted position;

Figs. 6 and 7 are cross sectional views in elevation of the same showing two different positions of a movable partition in one of the cartridge chambers;

Fig. 8 is a side view of the same magazine box in an inverted position showing the method of loading the same;

Fig. 9 is a side view partly sectioned, of an automatic gun with my improved magazine feed;

Fig. 10 is a cross sectional view through line A—A of Fig. 9;

Fig. 11 is a detail view in perspective of the rear end of the butt-stock;

Fig. 12 is a vertical longitudinal section of the rear part of the rifle provided with my magazine feed;

Fig. 13 is a plan view of the same;

Figs. 14 and 15 are respectively a rear view and a side view showing the magazine box and the feeding mechanism;

Fig. 16 is a cross sectional view through line B—B of Fig. 15;

Fig. 17 is a side view of a magazine box best adapted for use in hand operated rifles;

Fig. 18 is a vertical cross sectional view and in an enlarged scale through line C—C of Fig. 12;

And Fig. 19 is a detail plan view in an enlarged scale showing a form of rack which can be used in connection with my magazine box.

My improved magazine feed consists essentially of two elements, namely, the magazine box which is a narrow and long container, the shape of which renders it adapted for insertion within a hollow butt-stock of approximately the ordinary size and form; said magazine box being divided into a number of chambers each adapted to receive a number of cartridges horizontally arranged one on top of the other; and a feed rack preferably actuated by the breech block of the gun to which the magazine feed is applied, gradually removing the cartridges one by one from said magazine box and pushing the same into the loading chamber ready to be fed into the gun barrel through the action of the breech block.

In Figs. 1 to 8 I show a general construction of a magazine box made according to my invention, adapted to be operated by a rack moving longitudinally in an axial plane above the box as shown in Fig. 9. My improved magazine box 20, is a hollow container preferably made of sheet metal and shown in the drawings as being composed of two sides 21, 22 which are reinforced and maintained at a proper distance by a rear end 23, a forward end 24, and intermediate partitions 25, 26, 27, 28, 29, 30, 31, and of a removable bottom 32 which is slidable in a runway which is obtained by providing cross rivets 33 between the sides of the box leaving a clear space 34 between said rivets and the partitions opposite the same. Partitions 25, 26, 27, 28, 29, 30, 31 do not run all the way to the top of the box but leave a clear space therein to provide a runway for the top row of cartridges.

By means of the construction just mentioned the feeding box is divided into a rear chamber 35, a forward chamber 36 and a number of intermediate chambers 37, 38, 39 40, 41, 42, the width of these chambers being slightly larger than the diameter, and the length of the chamber being slightly greater than the length of the cartridge which said chambers have to receive.

The upper parts 43, 44, of the two sides are curved inward so as to follow the shape of the cartridge, in order to prevent the exit of the cartridges from the top of the box. For the purpose of feeding the cartridges to the gun however a slot 45 is left between rounded portions 43 and 44 at the top of the box.

The top portion of the front chamber is partly notched off at 46, the forward part of the upper edges of the same continuing up to the end of the box so as to remain about at the level of the axis of the top cartridge which is the axis of the series of cartridges constituting the actual feed line. This permits the cartridge 47 which is located in the forward chamber 46 to assume an inclined position as shown in Fig. 9.

As said above, the upper part of the box constitutes the runway for the series of cartridges which are gradually being fed to the gun barrel by the action of a rack as will be further explained. In order to maintain the cartridges against the runway a leaf pressure spring 48 is inserted in each chamber after the same has been filled with the proper number of cartridges, said spring arrangement being substantially the same as ordinarily employed for feeding cartridges from the cartridge holder in the magazine to the feeding chamber in the Springfield and other guns.

The gradual feeding of the cartridge from the magazine to the gun, as will be further described, takes place through the shifting of the entire upper line of cartridges one step forward at each operation; so that while cartridge 47 from forward chamber 36 is fed into the firing chamber, upper cartridge 49 of chamber 42 takes its place; cartridge 50 takes the place of 49 etc. until upper cartridge 55 of rear chamber 35 takes the place of cartridge 54 in chamber 37 and a new cartridge 56 in chamber 35 can then take its place, all the remaining cartridges in said chamber being pushed up by the corresponding spring 48. At the next stroke the same operation is repeated and one more cartridge is thus removed from chamber 35 etc. until chamber 35 is emptied and the same thing will happen in chamber 37 and successively in all the remaining chambers until the magazine box is empty.

It is obvious that in the course of this operation the sliding of each top cartridge from one to the next chamber takes place against the pressure of all the springs 48 inside of said chambers and therefore there will be some friction between the top cartridge and the row of cartridges within the chambers; there is also the danger of one cartridge of the said next row altogether stopping the progress of the cartridges being fed by engaging with its rear end with the circular notch which is provided in each cartridge for the purpose of engaging the extractor removing the shell from the gun barrel after explosion.

To prevent such a possibility and to diminish the friction opposing the movement of the top line of cartridges, I have devised a simple contrivance which is illustrated in the drawings and which merely consists of a swinging partition 57 provided with a lug 58 bent at right angles thereto and adapted to be inserted through slot 59 which is provided through each one of the intermediate chambers as shown in Fig. 1. Said partition can be inserted in place through slot 45 and its normal position when the feed box is completely loaded is the one shown in Fig. 6 where it is seen that a succession of such partitions form a smooth runway for the line of cartridges which must be fed from chamber to chamber. Said partitions 57 are susceptible of a pivotal motion around slot 59 which will cause them to swing 90 degrees upward and to assume the position shown in Fig. 7 when there is no upper cartridge to oppose said motion; this only can happen when the next rear chamber has been completely emptied and the top cartridges of the chamber under consideration have been fed through the runway and there is therefore no other cartridge from the rear being fed to replace it. At this point of the feeding the pressure of the spring in the chamber exerted on the column of remaining cartridges in said chamber will be exerted against the partition which will then be free to swing and assume the position shown in Fig. 7. When the said chamber has also been completely emptied the same thing will happen in the next forward chamber etc. until all the chambers are empty.

With this arrangement when the partitions 57 are in their open position as shown in Fig. 7, their inner surface is even with the inner surface of side plate 21 which is therefore embossed in its portion 59' so as to form an enlarged space within the box to allow for the thickness of partition 57, as clearly shown in Figs. 6 and 7.

To fill the magazine box partitions 57 are first inserted in place in the position shown in Figs. 3 and 4, and a top row of cartridges is then inserted from the front end as shown in Fig. 1 so that partitions 57 in intermediate chambers 37, 38, 39, 40, 41, 42 are prevented from swinging outwardly by the interposed cartridges. The magazine box is then inverted as shown in Fig. 8, the balance of the cartridges inserted in rear chamber 35 and then its relative pressure spring 48, after which sliding bottom 32 is slid in place so as to close chamber 35 leaving the remaining chambers open for filling. Next chamber 37 is then filled and the relative spring inserted in the same manner and sliding bottom 32 is pushed forward to close also said chamber 37 etc. In Fig. 8 the feeding box appears to have been filled up to chamber 40, chamber 41 being ready to be filled next. When all the chambers have been thus filled in succession and sliding bottom 32 completely closes all the chambers, the magazine feed box is ready for use.

In the forward end chamber 36 only one cartridge is inserted, the same resting against the inclined surface of a special pressure plate 60 which under the pressure of its corresponding spring 48' (Fig. 5) causes the cartridge 47 to assume an upwardly inclined position as shown in Fig. 9 so that the same can be properly fed into the firing chamber during the return motion of the breech block.

In Figs. 9, 10, and 11 is shown an automatic gun provided with a firing and feeding mechanism adapted for use in connection with the magazine box just described. In Fig. 9 the gun is shown in the position at the moment when the breech block having been pushed backward by force of recoil and having thus ejected the shell in the customary manner is ready for returning to its normal position, at the same time feeding a new cartridge into the gun barrel.

61 designates a hollow butt-stock provided with a chamber 62 opening at the rear and adapted to be closed by means of a sliding cover 63 engaging a catch 64, or in any other suitable manner.

Said chamber is made of the exact dimensions necessary to accommodate a magazine feed box 65 as shown in Fig. 9. Chamber 62 extends so that the forward end chamber 36 of the feed box comes right underneath the loading chamber of the gun, as shown in Fig. 9, and therefore it is obvious that the firing mechanism which is usually located centrally to the gun must in this case, be located at one side. Except for this requirement, which must be met, any hand controlled or automatic feeding and firing arrangement may be adopted for operating the gun. As an example I illustrate in the drawings one of the arrangements which may be adopted. In the same 66 designates a breech block which has been forced back by the force of recoil against the action of spring 67. The same is shown having its lower tooth 68 engaging the rear of cartridge 47 which is maintained in an inclined position by the inclined surface of plate 60 as hereinbefore explained. During its backward motion breech block 66 has forced back hammer 69 against the action of two side springs 70. Said hammer 69 is provided with two side arms 71, 72 each provided with a rod 73 on which the action of spring 70 is exerted. The object of this arrangement is to clear all the space at the sides of the loading chamber so that an opening can be provided in the same for the expulsion of the empty shells in the ordinary manner.

One of the side arms 72 is shown provided with a rearwardly directed extension 74 provided with a lug 75. When the action of the recoil has ceased spring or springs 67 will force breech block 66 forward to its normal position close to the firing chamber and said breech block will therefore feed cartridge 47 into said chamber. Hammer 69 will follow breech block 66 in this forward motion on account of the action of springs 70 until lug 75 engages tooth 76 which is in its path. Hammer 69 will therefore stop at a certain point of its forward motion while breech block 66 is free to proceed to the end. The pulling of the trigger 77 will cause the lowering of tooth 76 through the medium of a lever 78 and a crank lever 79 pivoted at 80, and the hammer will therefore be free to strike the firing pin which will be provided within breech block 66. A tension spring 81 will cause the return of tooth 76 and trigger 77 to their normal position as clearly shown in Fig. 9, ready for the next shot.

It will be observed that there is one element which moves rearwardly and then forward immediately upon the firing of each shell, and this is the breech block 66. This element is therefore eminently suitable for the operation of a toothed feed bar of a proper design to effect the feeding of the cartridge from the magazine box. One form of toothed feed bar which can be used is shown in Fig. 9 in which 82 is the feed bar attached at its forward end to the breech block and suspended to a sliding member 83 by means of two looose pivotal connections 84, 85. Upon the breech block starting its rearward motion feed bar 82 will first be lifted out of the path of the cartridges through the action of pivotal connections 84, 85 and then it will pull back sliding member 83 to the position shown in Fig. 9. As soon as the breech block moves forward the feed bar will also move forward sliding on top of the cartridges until it is possible for the teeth 85' of said feed bar to engage the rear of the cartridges forming the upper row in the magazine box, the entire line of cartridges will then be fed one step forward and a new cartridge will be pushed in line in the rear chamber of the feed box. The gun is thus ready for firing, and upon the shot being fired the entire operation will again automatically take place.

By observing Fig. 10 it will be noted that while trigger 77 is located centrally to the gun, the remaining parts of the firing mechanism are located at one side of the gun, the motion of the trigger being conveyed to the same by means of a shaft 86. The butt-stock is shown preferably provided with two notches 87 at the rear adapted to receive the operator's fingers in order to grip and remove the empty magazine box, which can instantly be replaced by another one, as readily and easily as is now done with ordinary cartridge holders.

In Figs. 12 to 19 I illustrate my invention as applied in connection with a hand operated rifle. In the same I illustrate a magazine feed box 88 which is slightly different from the one hereinbefore described inasmuch as the slot in which the feed action of the feed bar takes place is located at one side at 89 instead of at the top. This arrangement may in many instances be preferable to the one formerly described because the feed bar operating at this side will not require any extra room between the top of the feed box and the hammer and will not obstruct the sighting line of the gun. This arrangement may be used both in connection with hand operated guns and automatic guns by suitable design of the different parts. The forward chamber 90, however is open at the top, as illustrated, allowing the cartridge 91 to project in an inclined position ready for being fed into the firing chamber by the breech block 92.

The magazine box 88 is in this case shown divided into five chambers each accommodating one set of cartridges of the ordinary length used in the Springfield rifle.

Also in this case the firing mechanism must be arranged at one side of the butt-stock as shown in Fig. 12 where 93 designates the butt-stock of a hand rifle; 94 is the handle integral with and operating breech block 92; 95 is the hammer. In order to have the firing mechanism on one side the ordinary arrangement seen in a Springfield gun can be adopted, the various parts being rotated 90 degrees. Thus in Figs. 12 and 13 where the gun is shown in the firing position, lug 96 which is integral with hammer 95 and which is ordinarily arranged on the axial plane of the gun is shown horizontally extended at one side abutting against tooth 97 which is controlled by trigger 98. 99 designates a cam slot provided in the body of a breech block and which acts against the lower surface of lug 96 when arm 94 is operated to rotate breech block 92 about 90 degrees to the left in reference to position shown in Figs. 14 and 18; its action being to force hammer 95 back, the same moving longitudinally through sleeve member 100 which can move longitudinally with the breech block but cannot rotate with the same.

The operation of the gun is quite similar to that of any hand operated gun inasmuch as after a shot has been fired arm 94 is rotated about 90 degrees to the left and breech block 92 slid backward to position shown in Fig. 15. The breech block is then moved forward, pushing a cartridge 91 into the firing chamber and handle 94 is returned to its normal position while hammer 95 remains cocked, its forward motion being opposed by tooth 97 engaging lug 96. Upon pressing the trigger 98 the motion of the same is transmitted through shaft 101 to lever 102 which in its turn causes a crank lever 103 pivoted at 104 to pull down tooth 97 against the action of spring 105. The hammer will then be free to strike against the firing pin.

In the mechanism just described there is one element, namely sleeve 100, which follows the backward and forward longitudinal motion of the breech block but not its rotary motion; the same is therefore used for attaching and operating the feed bar 106, which is provided with teeth 107 and which is attached to a sliding member 108 by means of loose arms 109, 110 allowing the same to swing close to said sliding member as shown in dotted lines in Fig. 19. In Fig. 13 it is shown how said feed bar is arranged at the side of the gun stock to operate through slot 89 provided in the magazine feed box. In the same manner as hereinbefore described, upon the breech block being moved backward the feed bar will first swing close to sliding member 108 and will then pull the same to the rear; upon the breech block being moved forward the feed bar will engage the top row of cartridges in the magazine feed box and push the same one step forward. The same operation can be repeated until the magazine box is entirely empty when the cover 111 closing the housing in the butt-stock can be opened, the empty magazine box removed and a new loaded one readily inserted.

From the foregoing it is seen that I provide a new and simple arrangement for feeding cartridges which is possessed of considerable advantages, being extremely simple, compact and light in weight. It is obvious that the different details of construction of the various parts can be modified to a considerable extent without departing from the spirit of this invention; and I reserve to myself the right to bring to the same all those modifications which may be rendered necessary to fulfil different requirements and which enter into the scope of the appended claims.

I claim—

1. In combination with a gun a removable magazine box comprising a plurality of serially arranged cartridge holding chambers, said box being adapted to be used as a magazine while the gun is being fired, substantially as set forth.

2. In a magazine feed and in combination with a gun provided with a casing, a removable box comprising a plurality of serially arranged cartridge holding chambers each adapted to contain one column of longitudinally arranged cartridges arranged one on top of the other, said box being adapted to be used as a magazine while the gun is being fired.

3. A removable magazine feed box comprising a plurality of serially arranged cartridge holding chambers, said box being provided with a longitudinal slot, a removable bottom for said box and springs pressing the rows of cartridges in the several chambers against the slot bearing portion of the box; for the purposes as set forth.

4. A removable magazine feed box comprising a plurality of upwardly arranged partitions dividing said box into a plurality of serially arranged cartridge holding chambers, said partitions leaving a clear space at the top to provide a runway for the upper series of cartridges; substantially as set forth.

5. In a magazine feed the combination of a removable magazine feed box adapted to be used as a magazine while the gun is being fired, a plurality of column like arranged sets of cartridges serially arranged therein, said cartridges being arranged in a longitudinal position and the top cartridges of each set forming a continuous longitudinal row, springs causing said cartridges to press against the feeding portion of said box, and means for feeding said longitudinal row of cartridges away from said box.

6. A removable magazine feed box comprising a plurality of serially arranged cartridge holding chambers and a spring actuated guide plate in the forward chamber, said guide plate being adapted to maintain a cartridge projecting in an upwardly inclined direction from said chamber; for the purposes as set forth.

7. A removable magazine feed box provided with a plurality of upwardly directed partitions dividing the same into a plurality of cartridge holding chambers, said partitions leaving a free space at the upper part of said box, a longitudinal running slot through said upper part, sets of cartridges arranged column like in a longitudinal direction within said chambers, a removable bottom for said box and springs inserted between said bottom and the lower cartridge of each set forcing each set of cartridges against the upper part of said box; for the purposes as set forth.

8. A removable magazine feed box provided with a plurality of upwardly directed partitions dividing the same into a plurality of cartridge holding chambers, said partitions leaving a free space at the upper part of said box, a longitudinal running slot through said upper part, sets of cartridges arranged column like in a longitudinal direction within said chambers, a removable bottom for said box, springs inserted between said bottom and the lower cartridge of each set forcing each set of cartridges against the upper part of said box and a feed bar operating through said slot feeding the longitudinal upper row of cartridges in an axial direction away from said box.

9. In a gun the combination of a hollow butt-stock and a removable magazine feed box adapted to be inserted therein, said box being divided into a plurality of serially arranged cartridge holding chambers and being adapted to be used as a magazine while the gun is being fired; for the purposes as set forth.

10. The combination of a gun having a hollow butt-stock, a magazine feed box adapted to be inserted within or removed from said butt-stock, and means for retaining the same within said butt-stock while the gun is being fired.

11. In a gun the combination of a hollow butt-stock provided with a housing, said housing extending up to and directly underneath the loading chamber, and a removable magazine feed box comprising a plurality of cartridge holding chambers arranged in longitudinal succession, said box being adapted to be inserted within said housing so that its forward end chamber will remain directly underneath the loading chamber of the gun, and being adapted to be used as a magazine while the gun is being fired.

12. In a gun the combination of a removable magazine feed box provided with a slot through which the cartridges contained therein can be fed to the loading chamber of the gun, a breech block, and means controlled by said breech block for feeding said cartridges through said slot.

13. In a gun the combination of a hollow butt-stock, a removable magazine feed box comprising a series of cartridge holding chambers, the cartridges being longitudinally arranged in a column in each chamber, the upper part of said box being provided with a longitudinal slot, springs pressing the cartridges in each chamber against the slotted part, a breech block and means controlled by said breech block feeding cartridges to the loading chamber of said gun; substantially as set forth.

14. In a gun the combination of a removable magazine feed box having a slot, a breech block and a feed bar operating through said slot the motion of which is controlled by the reciprocating motion of the breech block; for the purposes as set forth.

15. In a gun the combination of a hollow butt-stock, a magazine feed box comprising a series of cartridge holding chambers, cartridges arranged in columns within said chambers, the forward end chamber of said feed box being directly underneath the loading chamber of said gun, a spring actuated guide plate in said forward chamber maintaining a cartridge projecting in an upwardly inclined direction, a longitudinal slot through the upper part of said feed box, a spring in each chamber of said feed box pushing the cartridges against the slotted part of said box, a hammer, a trigger, intermediate parts between said hammer and trigger, said intermediate parts being arranged sidewise to said butt stock, a breech block and a feed bar operated by said breech block feeding cartridges to the loading chamber of the gun.

CARLO DE-FELICE.

Witnesses:
PASQUALE PASCALE,
SARAH KAUFMAN.